(12) United States Patent
Mao et al.

(10) Patent No.: US 9,432,173 B2
(45) Date of Patent: Aug. 30, 2016

(54) METHOD AND TRANSCEIVER FOR CANCELLING MULTI-CARRIER TRANSMISSION INTERFERENCE

(71) Applicant: Huawei Technologies Co., Ltd., Shenzhen, Guangdong (CN)

(72) Inventors: Mengda Mao, Shenzhen (CN); Siqing Ye, Shanghai (CN); Qian Yin, Shanghai (CN); Tao Pu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/337,854

(22) Filed: Jul. 22, 2014

(65) Prior Publication Data

US 2014/0334349 A1 Nov. 13, 2014

Related U.S. Application Data

(63) Continuation of application No. PCT/CN2012/072143, filed on Mar. 9, 2012.

(51) Int. Cl.
*H04L 5/14* (2006.01)
*H04B 1/04* (2006.01)
(Continued)

(52) U.S. Cl.
CPC ............ *H04L 5/1461* (2013.01); *H04B 1/0475* (2013.01); *H04B 1/525* (2013.01); *H04L 27/2626* (2013.01); *H04L 27/2647* (2013.01); *H04L 27/368* (2013.01)

(58) Field of Classification Search
CPC ...... H04B 1/0475; H04B 1/525; H04B 1/04; H04B 1/12; H04B 1/52; H04B 1/38; H04B 1/126; H04L 27/2626; H04L 27/36; H04L 27/2647; H04L 27/368; H04L 25/49; H04L 25/03006; H04L 12/56; H04L 5/1461; H04W 28/00; H04W 92/00
USPC ........ 370/290, 310, 338, 278, 282; 455/103, 455/114.2, 295–296; 375/260, 265, 285, 375/296–297
See application file for complete search history.

(56) References Cited

U.S. PATENT DOCUMENTS

| | | | | |
|---|---|---|---|---|
| 4,564,952 A | * | 1/1986 | Karabinis | ............... H04L 27/01 333/18 |
| 8,855,580 B2 | * | 10/2014 | Dent | ...................... H04B 1/525 455/114.2 |

(Continued)

FOREIGN PATENT DOCUMENTS

| | | |
|---|---|---|
| CN | 101420246 A | 4/2009 |
| CN | 102231620 A | 11/2011 |

(Continued)

*Primary Examiner* — Mohamed Kamara
(74) *Attorney, Agent, or Firm* — Leydig, Voit & Mayer, Ltd.

(57) ABSTRACT

A method, an apparatus, and a transceiver for cancelling multi-carrier transmission interference are provided. The method includes: collecting a high order intermodulation signal in radio frequency signals output by a transmitter; processing the high order intermodulation signal so as to generate a first digital signal; establishing a high order intermodulation model by using the first digital signal and a first baseband signal output by the transmitter; generating a second digital signal by using a coefficient of the high order intermodulation model and a second baseband signal output by the transmitter; and counteracting interference in a digital signal output by a receiver with the second digital signal. By using the present invention, high order intermodulation interference of a multi-carrier transmitter on a receiver can be effectively canceled, and therefore, difficulty in duplexer design and requirements on a suppression degree are reduced.

17 Claims, 5 Drawing Sheets

(51) Int. Cl.
*H04B 1/525* (2015.01)
*H04L 27/26* (2006.01)
*H04L 27/36* (2006.01)

(56) References Cited

U.S. PATENT DOCUMENTS

| | | |
|---|---|---|
| 2004/0048576 A1 | 3/2004 | Hildebrand et al. |
| 2007/0184782 A1 | 8/2007 | Sahota et al. |
| 2009/0023403 A1* | 1/2009 | LaBerge ............... H04B 15/02 455/114.2 |
| 2009/0086863 A1 | 4/2009 | Komninakis et al. |
| 2010/0165895 A1* | 7/2010 | Elahi ..................... H04L 5/1423 370/290 |
| 2010/0322346 A1 | 12/2010 | Aparin |
| 2011/0149714 A1 | 6/2011 | Rimini et al. |
| 2011/0195672 A1* | 8/2011 | Pratt ..................... H04B 1/525 455/78 |
| 2011/0228828 A1 | 9/2011 | Wang et al. |

FOREIGN PATENT DOCUMENTS

| | | |
|---|---|---|
| EP | 2019486 A1 | 1/2009 |
| JP | 2009118199 A | 5/2009 |
| WO | WO 2011148341 A1 | 12/2011 |

\* cited by examiner

METHOD AND TRANSCEIVER FOR CANCELLING MULTI-CARRIER TRANSMISSION INTERFERENCE

CROSS-REFERENCE TO RELATED APPLICATIONS

This application is a continuation of International Patent Application No. PCT/CN2012/072143, filed on Mar. 9, 2012, which is hereby incorporated by reference in its entirety.

TECHNICAL FIELD

The present invention relates to the field of communications technologies, and in particular, to a method and a transceiver for cancelling multi-carrier transmission interference.

BACKGROUND

A base station device is an important component of a cellular mobile communications system and refers to a radio transceiver station that transfers information with a mobile phone terminal through a mobile communication switching center within certain radio coverage. A base station device generally includes a receiving device and a transmitting device; where the receiving device and the transmitting device are collectively called a transceiver.

For a frequency-division duplex transceiver, to ensure that a receiving device and a transmitting device can work at the same time, a duplexer is usually used to isolate a transmitted signal and a received signal. The duplexer includes two groups of filters of different frequencies to avoid transmitting a transmitted signal of the transceiver to a receiving device, and to suppress the interference and noise entering the receiving device at the same time, thereby suppressing outward spurious emission and interference of the transmitting device.

A multi-mode and multi-carrier base station transceiver may support a plurality of communications standards, such as GSM (Global System of Mobile Communication) and WCDMA (Wideband Code Division Multiple Access). A base station device that supports a plurality of carriers facilitates network expansion. Therefore, more and more operators use a multi-carrier and multi-mode base station.

If a transmitted signal of the duplexer is not suppressed appropriately for the receiver, another filter following the receiver, such as a SAW (Surface Acoustic Wave), may be used for further filtering; however, when intermodulation of the transmitted signals of a multi-carrier base station falls into a receive frequency band through the duplexer, if the intermodulation shares a frequency with a received signal, the intermodulation will directly interfere with the received signal. For example, assuming that, in a 1800 MHz GSM frequency band, two transmitted signals are 1805 MHz and 1828.75 MHz and a gap between the two signals is 23.75 MHz, 7-order intermodulation of the transmitted signals is 1805 MHz−3*23.75 MHz=1733.75 MHz, and received signals happen to be 1710 MHz and 1733.75 MHz, in this case, a receive filter does not filter for the frequency band and therefore only a transmit filter of the duplexer can be used for suppressing. An example is taken where each carrier of a transmitted signal has transmit power of 40 dBm, transmitter remote intermodulation (that is, a power difference between intermodulation and a carrier) is 60 dBc, a signal resolution bandwidth is 200 kHz, and noise of an interference signal that enters a receiver is required 10 dB lower than thermal noise at an antenna port, a receive-transmit suppression degree of a transmit filter in a receive frequency band should be (40-60) dBm−(−174 dBm+10*lg (200 k)−10)=111 dB, where −174 dBM is thermal noise per Hz in normal temperature at the antenna port. A duplexer can achieve such a high suppression degree only by adding filter cavities, which leads to a large size of the duplexer.

With an increasing demand for miniaturization of communications base station devices and emergence of new-form base stations (such as a base station with an active antenna), it is quite important to reduce difficulty in duplexer design and reduce a suppression degree of a duplexer.

SUMMARY

In one aspect, the present invention provides a method for cancelling multi-carrier transmission interference, which can effectively cancel high order intermodulation interference of a multi-carrier transmitter on a receiver and therefore reduce difficulty in duplexer design and requirements on a suppression degree.

In another aspect, the present invention provides a transceiver, which effectively cancel high order intermodulation interference of a multi-carrier system receiver and reduce the complexity of a device.

Therefore, embodiments of the present invention provide the following technical solutions:

A method for cancelling multi-carrier transmission interference is provided. The method includes: an apparatus collects a high order intermodulation signal in radio frequency signals output by a transmitter. The apparatus then processes the high order intermodulation signal so as to generate a first digital signal. The apparatus then establishes a high order intermodulation model by using the first digital signal and a first baseband signal output by the transmitter. The apparatus then generates a second digital signal by using a coefficient of the high order intermodulation model and a second baseband signal output by the transmitter. Accordingly, the apparatus counteracts interference in a digital signal output by a receiver with the second digital signal.

A transceiver is provided, including a transmitter and a receiver, and further including a processor for cancelling multi-carrier transmission interference. The processor is configured to collect a high order intermodulation signal in radio frequency signals output by a transmitter and process the high order intermodulation signal so as to generate a first digital signal. A high order intermodulation model is established by the processor by using the first digital signal and a first baseband signal output by the transmitter. Accordingly, a second digital signal is generated by the processor by using a coefficient of the high order intermodulation model and a second baseband signal output by the transmitter. The processor is further configured to counteract interference in a digital signal output by a receiver with the second digital signal.

According to the method and transceiver for cancelling multi-carrier transmission interference that are provided by the present invention, by collecting a high order intermodulation signal in radio frequency signals output by a transmitter, processing the high order intermodulation signal so as to generate a first digital signal, establishing a high order intermodulation model by using the first digital signal and a baseband signal output by the transmitter, generating a second digital signal by using a coefficient of the high order intermodulation model and the baseband signal, and counteracting interference in a digital signal output by a receiver with the second digital signal, therefore effectively cancelling high order intermodulation interference in the receiver and reducing difficulty in duplexer design and requirements on a suppression degree.

BRIEF DESCRIPTION OF DRAWINGS

To illustrate the technical solutions in embodiments of the present invention or in the prior art more clearly, the following briefly describes the accompanying drawings required for describing the embodiments. Apparently, the accompanying drawings in the following descriptions merely show some of the embodiments described in the present invention, and persons of ordinary skill in the art may obtain other drawings from the accompanying drawings.

DESCRIPTION OF EMBODIMENTS

In order to make persons skilled in the art better understand the solutions of the embodiments of the present invention, the embodiments of the present invention are further described in detail below with reference to the accompanying drawings and implementation manners.

Figure 1:
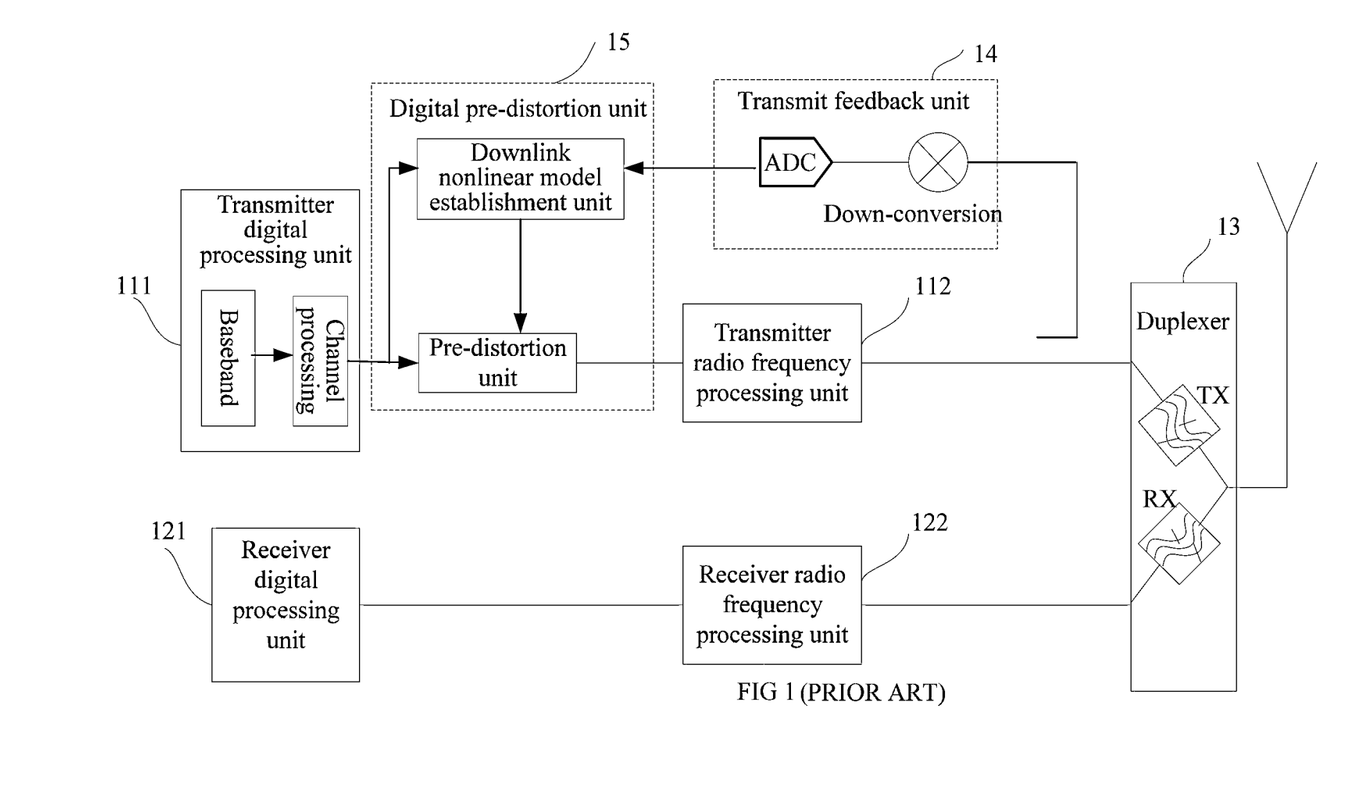
FIG. 1 is a basic block diagram of an existing multi-carrier transceiver.

A basic block diagram of an existing multi-carrier transceiver is shown in FIG. 1, where a transmitter includes a transmitter digital processing unit 111 and a transmitter radio frequency processing unit 112; and a receiver includes a receiver digital processing unit 121 and a receiver radio frequency processing unit 122. In addition, the multi-carrier transceiver may further include a duplexer 13, a transmit feedback unit 14, and a digital pre-distortion unit 15.

Figure 2:
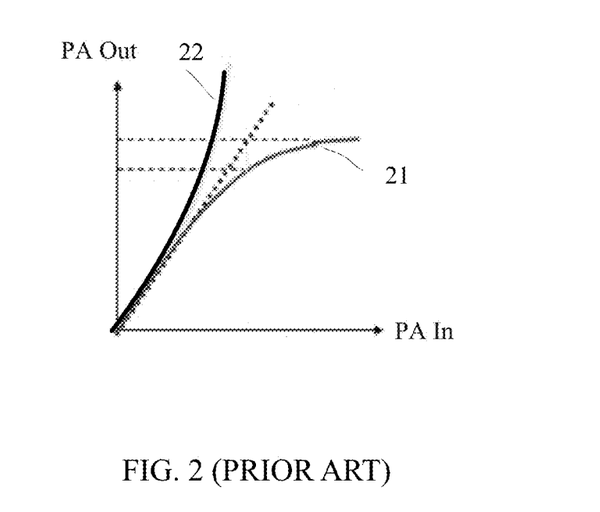
FIG. 2 is a nonlinear schematic diagram of an output signal and an input signal in an existing multi-carrier transceiver.

Due to the nonlinearity of power amplification, an output signal and an input signal may become nonlinear as shown by curve 21 in FIG. 2, and such nonlinearity may cause spectrum multiplication, leading to an intermodulation signal. If a compensation function is added in a digital domain to make a compensation feature (as shown by curve 22 in FIG. 2) just cancel the downlink nonlinearity, an entire system may work in a linear state.

Based on the preceding principle, the transmit feedback unit 14 in FIG. 1 is set in a feedback channel, performs processing such as frequency conversion and analog-to-digital conversion on coupled radio frequency signals output by the transmitter, and then outputs a processed digital signal to the digital pre-distortion unit 15. The digital pre-distortion unit 15 establishes a downlink nonlinearity model according to a baseband signal of the transmitter and the digital signal output by the transmit feedback unit 14, obtains a compensation coefficient according to the nonlinearity model, and compensates an output signal in the digital domain by using the obtained compensation coefficient, thereby making the entire system work almost linearly.

Due to a limited orders in digital pre-distortion modeling, a sampling rate of a DAC (digital-to-analog convertor) in a transmitting channel and a sampling rate of an ADC (analog-to-digital convertor) in a feedback channel are limited, and modeling dynamics are limited (according to the Nyquist Theorem, a maximum bandwidth of a sample signal may be half of a sampling rate; if the sampling rate of the ADC is 500 MHz, a signal of a maximum bandwidth of 250 MHz may be collected theoretically, that is, a maximum gap between intermodulation and a center frequency is 125 MHz, and in addition, dynamics of a high-speed ADC are limited, for example, if a signal-to-noise ratio is 70 dB, a high order intermodulation signal will be at least 70 dB lower than a main signal); therefore, digital pre-distortion can only rectify intermodulation of a frequency band close to a baseband signal (that is, a bandwidth of an effectively collected signal on the feedback channel); for example, if a bandwidth of a multi-carrier signal is high (such as 75 MHz), only 3-order and 5-order rectification are supported, and an intermodulation signal of a high order part (usually higher than 5-order, the specific order depends on a bandwidth of a multi-carrier signal and frequency of a generated intermodulation signal) that falls into a receiver cannot be collected and rectified.

In view of the preceding technical problems, according to a method, an apparatus, and a transceiver for cancelling multi-carrier transmission interference that are provided by an embodiment of the present invention, based on an original feedback channel, a high order intermodulation signal in a transmitting channel is collected, a high order intermodulation signal that requires cancellation is amplified, so as to improve a signal-to-noise ratio of the high order intermodulation signal, and adaptive cancellation is performed on a generated high order intermodulation signal and a signal collected by a receiver, thereby achieving an objective of cancelling transmission interference and lowering requirements of a transmit filter of a duplexer on a suppression degree in a receive frequency band.

Figure 3:
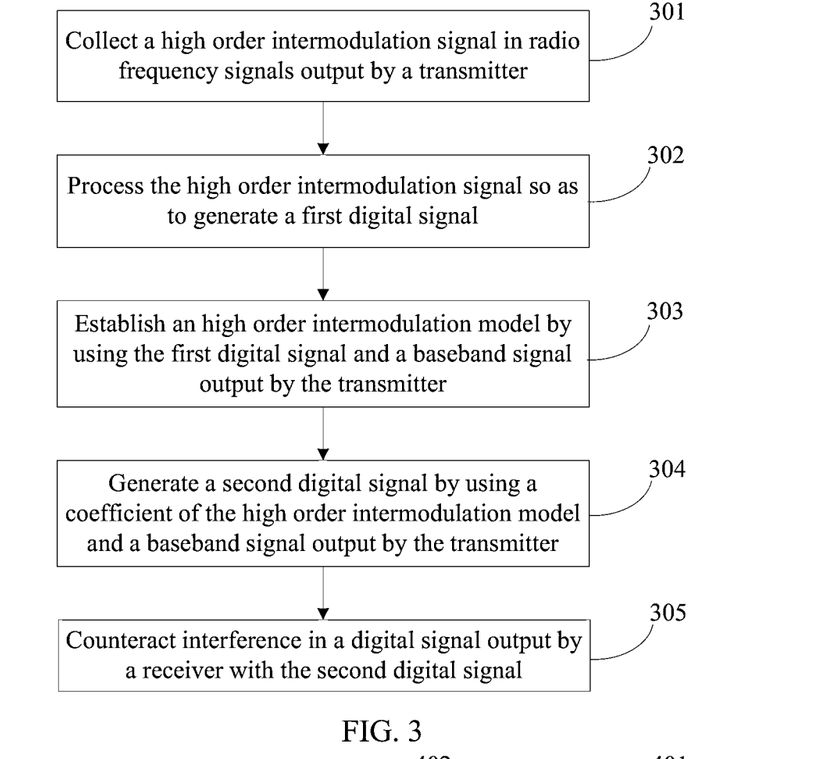
FIG. 3 is a flowchart of a method for cancelling multi-carrier transmission interference according to an embodiment of the present invention.

FIG. 3 is a flowchart of a method for cancelling multi-carrier transmission interference according to an embodiment of the present invention, including the following steps:

Step 301: Collect a high order intermodulation signal in radio frequency signals output by a transmitter.

Specifically, a part of radio frequency signals output by a transmitter radio frequency processing unit may be coupled, a main signal and a low order intermodulation signal in the coupled radio frequency signals are filtered to obtain the high order intermodulation signal, and the high order intermodulation signal is amplified to a required signal amplitude.

It should be noted that, a part of radio frequency signals may be coupled through a section of a parallel transmission line and a coupling degree may be 20 to 50 dB, that is, power of the coupled radio frequency signals is $\frac{1}{100}$ to $\frac{1}{100000}$ of total power of the radio frequency signals output by the transmitter radio frequency processing unit, that is, power of the radio frequency signals to be transmitted is barely affected.

Step 302: Process the high order intermodulation signal so as to generate a first digital signal.

This processing procedure may mainly include processing such as frequency down-conversion and analog-to-digital conversion on the high order intermodulation signal.

Step 303: Establish a high order intermodulation model by using the first digital signal and a baseband signal output by the transmitter.

Specifically, a coefficient table of the high order intermodulation model may be established according to amplitude and phase characteristics of the baseband signal and amplitude and phase characteristics of the first digital signal; and in this coefficient table, different coefficients correspond to different amplitudes and phases. The baseband signal output by the transmitter may correspond to the collected radio frequency signals output by the transmitter.

In this embodiment, the procedure of establishing the high order intermodulation model, that is, steps 301 to 303, may be performed only at working initialization of the transceiver by using a baseband signal in a period, or be performed as required, for example, be performed at intervals (where the intervals are equal or unequal) to improve precision.

Step 304: Generate a second digital signal by using a coefficient of the high order intermodulation model and a baseband signal output by the transmitter.

That is to say, the second digital signal is obtained by multiplying the baseband signal and the coefficient of the high order intermodulation model. It should be noted that, the coefficient of the high order intermodulation model may be a group of discrete values. In this step, the baseband signal output by the transmitter may be a baseband signal in the procedure of establishing the high order intermodulation model in steps 301 to 303, or a baseband signal not in the procedure of establishing the high order intermodulation model in steps 301 to 303. The established high order intermodulation model is used to cancel interference for the baseband signal not in the procedure of establishing the high order intermodulation model in steps 301 to 303, which can avoid requirements of real-time collecting a high order intermodulation signal on components; and in the case of multiple transmitting channels, an apparatus required for establishing a high order intermodulation model may be used for establishing a high order intermodulation model in multiple transmit channels in a time-division manner, or in a case where a digital pre-distortion channel exists, an apparatus required for establishing a high order intermodulation model, such as a collection apparatus and/or an analog-to-digital convertor, may be shared in a time-division manner, thereby simplifying an apparatus structure of high order intermodulation cancellation and reducing system costs.

Step 305: Counteract interference in a digital signal output by a receiver with the second digital signal, where the digital signal output by the receiver corresponds to the baseband signal output by the transmitter in step 304.

Firstly, because comparison between the collected radio frequency signals output by the transmitter in step 301 and radio frequency signals output by the transmitter that is not collected shows that the radio frequency signals output by the transmitter that is not collected travels by a transmission path formed of a duplexer, an antenna, an air interface transmission and receive channel, an amplitude and a phase of the digital signal output by the receiver, compared with an amplitude and a phase of the second digital signal obtained through the high order intermodulation model established according to the collected radio frequency signals output by the transmitter, has characteristics of the preceding transmission path; therefore, in the counteracting procedure, adaptive balancing may be performed on the second digital signal, that is, the second digital signal is adjusted by simulating impacts of the preceding transmission path on a signal. Secondly, if the digital signal output by the receiver is earlier than the second digital signal in time, the digital signal output by the receiver may be delayed according to a preset time. That is to say, it is optional to delay the digital signal output by the receiver according to a preset time. Finally, subtraction may be performed for the second digital signal that has been adaptively balanced and the delayed digital signal output by the receiver.

The adaptive balancing may be implemented on combined multiple carriers, specifically, may be implemented in a time domain or in a frequency domain. If the adaptive balancing is implemented in a time domain, FIR (finite impulse response) or IIR (infinite impulse response) may be used for filtering; or if the adaptive balancing is implemented in a frequency domain, FFT (fast Fourier transformation), frequency domain amplitude and phase weighting, and IFFT (inverse fast Fourier transformation) may be used together for filtering.

The balancing in a time-domain and balancing in a frequency-domain may implement complex amplitude and phase adjustment; no matter whether it is balancing in a time-domain or balancing in a frequency-domain, the adaptive balancing may use LMS (least mean square), LS (least squares), RLS (recursive least squares), or another adaptive balancing algorithm.

The delaying the digital signal output by the receiver according to a preset time is used to compensate an average delay difference between a digital signal that has been adaptively balanced and a digital signal output by the receiver digital processing unit. The average delay difference may be a frequency-domain average. Diversity at different frequency points is implemented through the adaptive balancing.

It should be noted that, in some cases, the digital signal output by the receiver may not be delayed according to a preset time, that is, the preset time may be 0.

It should also be noted that, the adaptive balancing may also be separately implemented on each multi-carrier, accordingly, that is, the adaptive balancing is separately performed on the second digital signal on each carrier, and likewise, the digital signal from the receiver digital processing unit is separately delayed according to a preset time on each carrier. Then, subtraction is performed for the second digital signal that has been adaptively balanced and the delayed digital signal correspondingly on each carrier.

No matter whether the adaptive balancing is implemented on combined multiple carriers or separately implemented on each multi-carrier, in an ideal case, a high order intermodulation interference signal may be completely cancelled, that is, a difference value obtained through the subtraction does not contain the high order intermodulation interference signal any longer. Therefore, in a case where transmit-receive isolation is the same, difficulty in duplexer design and requirements on a suppression degree may be reduced.

It should be noted that, the method for cancelling multi-carrier transmission interference that is provided by the embodiment of the present invention may be applied in all wireless communications technological fields, such as a mobile communications system, fixed wireless access, wireless data transmission, and another system.

Figure 4:
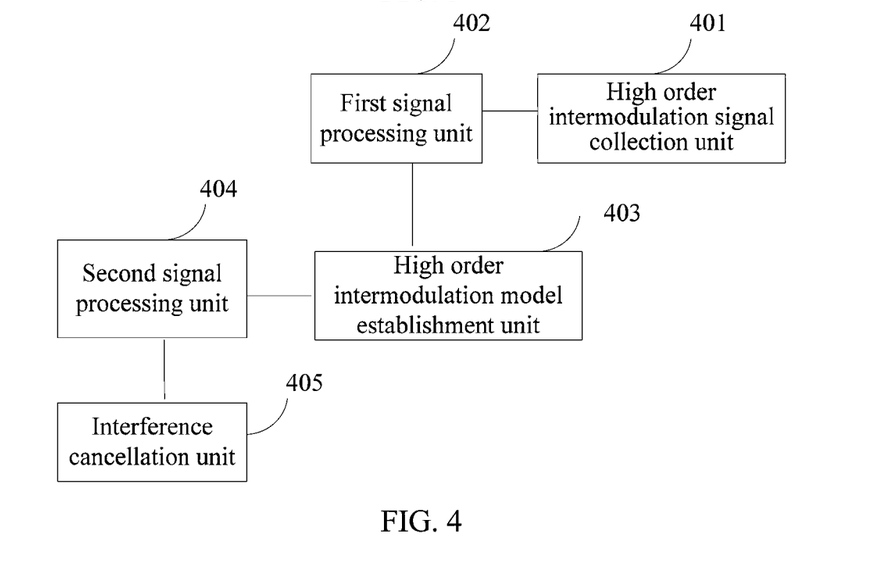
FIG. 4 is a simplified block diagram of an apparatus for cancelling multi-carrier transmission interference according to an embodiment of the present invention.

Accordingly, an embodiment of the present invention further provides an apparatus for cancelling multi-carrier transmission interference, as shown in FIG. 4, and FIG. 4 is a simplified block diagram of the apparatus.

In this embodiment, the apparatus includes:

a high order intermodulation signal collection unit 401, configured to collect a high order intermodulation signal in radio frequency signals output by a transmitter;

a first signal processing unit 402, configured to process the high order intermodulation signal so as to generate a first digital signal;

a high order intermodulation model establishment unit 403, configured to establish a high order intermodulation model by using the first digital signal and a first baseband signal output by the transmitter, where the first baseband signal output by the transmitter may correspond to the collected radio frequency signals output by the transmitter;

a second signal processing unit 404, configured to generate a second digital signal by using a coefficient of the high order intermodulation model and a second baseband signal output by the transmitter, where the second baseband signal output by the transmitter may be the first baseband signal output by the transmitter or another baseband signal output by the transmitter; and an interference counteraction unit 405, configured to counteract interference in a digital signal output by a receiver with the second digital signal, where the digital signal output by the receiver corresponds to the second baseband signal output by the transmitter that is used by the second signal processing unit 404.

A specific structure of the high order intermodulation signal collection unit 401 may include: a coupling unit, a filtering unit, and an amplification unit, where:

the coupling unit is configured to couple a part of the radio frequency signals output by the transmitter;

the filtering unit is configured to filter a main signal and a low order intermodulation signal in the coupled radio frequency signals to obtain the high order intermodulation signal; and the amplification unit is configured to amplify the high order intermodulation signal.

A specific structure of the interference counteraction unit 405 may include: an adaptive balancing unit and a subtraction unit, where:

the adaptive balancing unit is configured to perform adaptive balancing on the second digital signal; and the subtraction unit is configured to perform subtraction for the second digital signal that has been adaptively balanced and a delayed digital signal.

The subtraction unit may be implemented by using a phase inverter and an adder, or using another form, which is not limited here.

The interference counteraction unit 405 may further include: a delaying unit, configured to delay the digital signal output by the receiver according to a preset time if the digital signal output by the receiver is earlier than the second digital signal in time.

It should be noted that, the interference counteraction unit 405, when counteracting interference for a multi-carrier signal, may perform adaptive balancing on combined multiple carriers, that is, only one of the adaptive balancing unit is required, and accordingly, only one of the delaying unit and one of the subtraction unit are required. The interference counteraction unit 405, when counteracting interference for a multi-carrier signal, may also perform adaptive balancing separately on each carrier, and in this case, the number of the adaptive balancing units should equal to the number of carriers, and certainly, the number of the delaying units and the number of the subtraction units should also equal to the number of carriers, and subtraction on each carrier signal should be separately performed in a corresponding subtraction unit.

No matter whether the adaptive balancing is implemented on combined multiple carriers or separately implemented on each multi-carrier, in an ideal case, a high order intermodulation interference signal may be completely counteracted, that is, a difference value obtained through the subtraction does not contain the high order intermodulation interference signal any longer. Therefore, in a case where same transmit-receive isolation is achieved, difficulty in duplexer design and requirements on a suppression degree may be reduced.

It should be noted that, the apparatus for cancelling multi-carrier transmission interference that is provided by the embodiment of the present invention may be applied in all wireless communications technological fields, such as a mobile communications system, fixed wireless access, wireless data transmission, and another system.

The previously described embodiment of the apparatus is merely illustrative and in actual applications, the units that are described as separate units may be or may not be physically separate. In addition, the apparatus for cancelling multi-carrier transmission interference may be applied to an existing multi-carrier transceiver as an individual device, or be combined with an existing multi-carrier transceiver, fully utilizing existing units and reducing device costs. The following provides more details.

Figure 5:
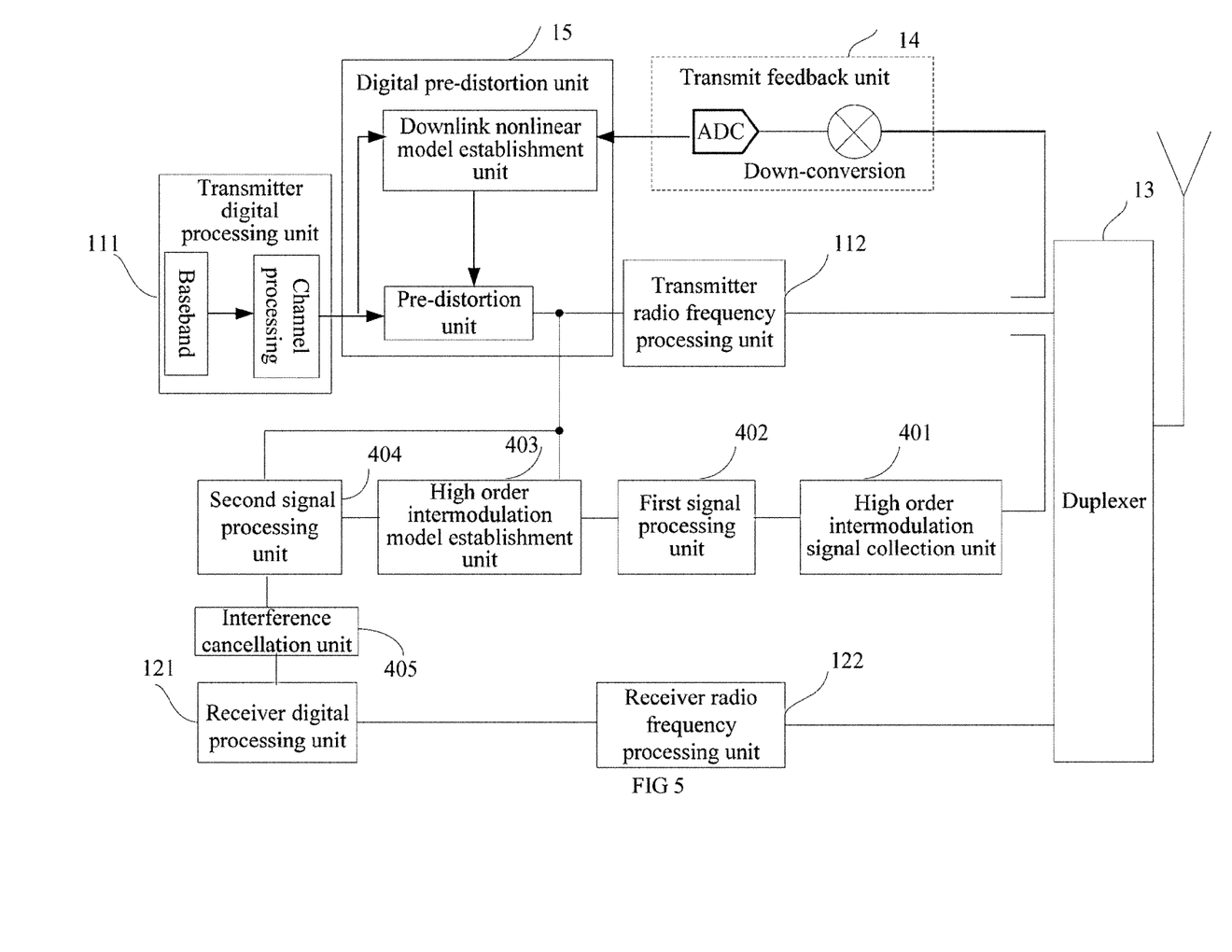
FIG. 5 is a simplified block diagram of a transceiver according to an embodiment of the present invention.

FIG. 5 is a simplified block diagram of a transceiver that applies an embodiment of the present invention.

In this embodiment, the apparatus for cancelling multi-carrier transmission interference is applied to an existing multi-carrier transceiver as an individual device, and processing procedures of downlink nonlinearity compensation in a transmitting channel and interference counteraction in a receive channel are implemented individually.

The transmit feedback unit 14 performs processing such as frequency conversion and analog-to-digital conversion on the coupled radio frequency signals output by the transmitter and then outputs a processed digital signal to the digital pre-distortion unit 15. The digital pre-distortion unit 15 establishes a downlink nonlinearity model according to a baseband signal of the transmitter and the digital signal output by the transmit feedback unit 14, obtains a compensation coefficient according to the nonlinearity model, and compensates an output signal in the digital domain by using the obtained compensation coefficient, thereby making the entire system work almost linearly.

The high order intermodulation signal collection unit 401 collects a high order intermodulation signal of radio frequency signals output by a transmitter, the first signal processing unit 402 processes the high order intermodulation signal so as to generate a first digital signal; then the high order intermodulation model establishment unit 403 establishes a high order intermodulation model by using the first digital signal and a first baseband signal (the baseband signal may be a baseband signal after nonlinearity compensation or a baseband signal before nonlinearity compensation) output by the transmitter, the second signal processing unit 404 generates a second digital signal by using a coefficient of the high order intermodulation model and a second baseband signal output by the transmitter; and the interference counteraction unit 405 performs adaptive counteracting for the second digital signal and digital signals that correspond to the second baseband signals output by the receiver and the transmitter, achieving the objective of cancelling transmission interference and reducing suppression degree requirements of transmitting of a duplexer on receiving of the duplexer in a receive frequency band.

Figure 6:
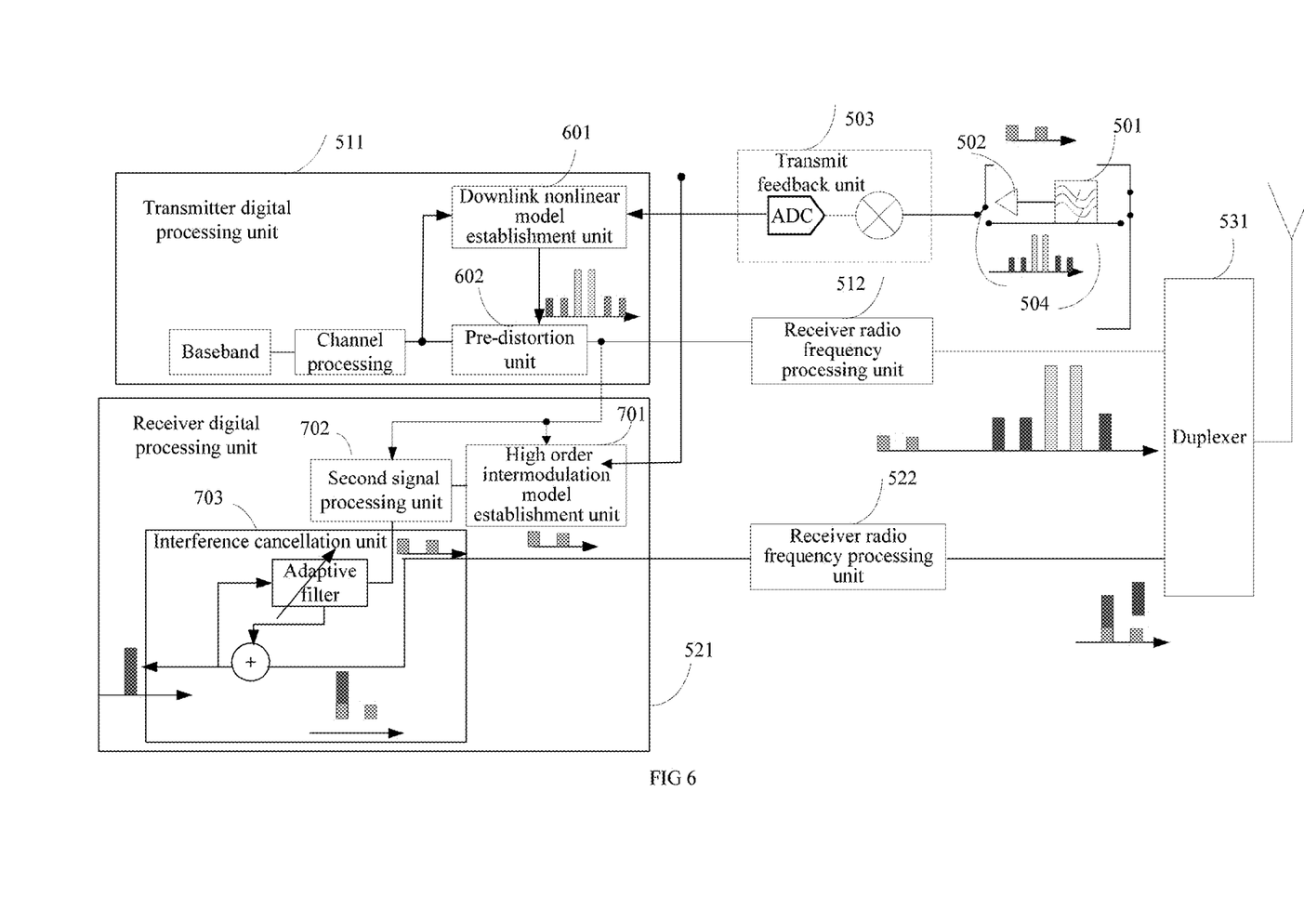
FIG. 6 is another simplified block diagram of a transceiver according to an embodiment of the present invention.

FIG. 6 is another simplified block diagram of a transceiver that applies an embodiment of the present invention.

In this embodiment, the apparatus for cancelling multi-carrier transmission interference is combined with an existing multi-carrier transceiver, fully utilizing existing units.

A filtering unit 501 and an amplification unit 502 of a high order intermodulation signal collection unit are set in a high order intermodulation collection channel, an existing transmit feedback unit 503 is set in a feedback channel, and a transmit feedback unit 503 also functions as a first signal processing unit in the apparatus for cancelling multi-carrier transmission interference to implement down-conversion and analog-to-digital conversion functions. A control unit 504 is configured to control a connection of the pre-distortion channel for collecting radio frequency signals output by a transmitter to the feedback channel and a connection of the high order intermodulation collection channel to the feedback channel in a time-division manner. Specifically, the control unit 504 may implement the control function by using a switch.

In this embodiment, the pre-distortion channel and the high order intermodulation collection channel work in a time-division manner, and specific time allocation may be determined according to pre-distortion rectification and high order intermodulation counteraction performance. For sure, working time of each channel may be allocated randomly.

A downlink nonlinearity model establishment unit 601 and a pre-distortion unit 602 of a digital pre-distortion unit may function as a part of a transmitter digital processing unit 511.

Likewise, in the apparatus for cancelling multi-carrier transmission interference, a high order intermodulation model establishment unit 701, a second signal processing unit 702, and an interference counteraction unit 703 may all function as a part of a receiver digital processing unit 521.

A transmitter radio frequency processing unit 512, a receiver radio frequency processing unit 522, and a duplexer 531 are the same as those in the prior art.

The transceiver in this embodiment has a hardware circuit that can be simply implemented without adding an extra ADC and a frequency conversion module. Certainly, in actual applications, an interference counteraction function may not be enabled if intermodulation interference does not affect sensitivity.

Assuming that a nonlinear response of power amplification is g(PA)=1+f(highIM)+f(lowIM), a distorted part of power amplification is collected through a pre-distortion channel, $f^{-1}$(lowIM) is obtained through model establishment, and compensation is implemented in the pre-distortion unit.

When a high order intermodulation channel is working, by collecting a power amplification high order signal, a high order intermodulation model f(highIM) of power amplification is obtained through model establishment; and once this model is obtained, this model and a pre-distorted baseband signal can be used for obtaining a current high order intermodulation composition, which is counteracted through an interference counteraction unit 703. Therefore, when the transmitter continuously outputs signals, pre-distorted digital signals are continuously output similarly, digital signals that travel through the high order intermodulation model establishment unit 701 are also continuously output, high order intermodulation formed in a digital domain and high order intermodulation output by power amplification are kept consistent, leading to adaptive counteracting for a generated high order intermodulation signal and a high order intermodulation interference signal in a signal received by a receiver. Therefore, in a case where transmit-receive isolation is the same, difficulty in duplexer design and requirements on a suppression degree may be reduced.

Accordingly, an embodiment of the present invention further provides a base station. The base station includes a transceiver in the preceding embodiment, where the transceiver not only includes a transmitter and a receiver, but also includes the preceding apparatus for cancelling multi-carrier transmission interference. The apparatus for cancelling multi-carrier transmission interference may be applied to an existing multi-carrier transceiver as an individual device, or be combined with an existing multi-carrier transceiver, fully utilizing existing units and reducing device costs. The base station may be applied to all wireless communications systems, such as a mobile communications system, fixed wireless access, wireless data transmission, and another system.

The embodiments in this specification are all described in a progressive manner, mutual reference may be made to the same or similar part of the embodiments, and each embodiment focuses on illustrating differences from other embodiments. In particular, for the device embodiment, since it is basically similar to the method embodiment, the device embodiment is described simply, and for the relevant part, reference may be made to the part of the description of the method embodiment. The described system embodiment is merely exemplary, where the units described as separate parts may be or may not be physically separate, and parts displayed as units may be or may not be physical units, may be located in one position, or may be distributed on multiple network elements. A part of or all of the modules may be selected according to the actual needs to achieve the objectives of the solutions of the embodiment. Persons of ordinary skill in the art may understand and implement the embodiment without creative efforts.

All or a part of the steps of the methods in the embodiments of the present invention may be implemented by a program instructing relevant hardware. The program may be stored in a computer readable storage medium, and the storage medium may be a ROM/RAM, a magnetic disk, a compact disk, or the like.

The embodiments of the present invention are described in detail above. Although the present invention is described with reference to specific embodiments, the description of the embodiments is only intended to help understand the method and device of the present invention. With respect to the implementation and applicability, modifications and variations may be made by persons of ordinary skill in the art according to the idea of the present invention. Therefore, the specification shall not be construed as a limitation on the present invention.

What is claimed is:

1. A method for cancelling multi-carrier transmission interference, comprising:
   collecting, by an apparatus, a high order intermodulation signal in radio frequency signals output by a transmitter;
   processing, by the apparatus, the high order intermodulation signal so as to generate a first digital signal;
   establishing, by the apparatus, a high order intermodulation model by using the first digital signal and a first baseband signal output by the transmitter;

generating, by the apparatus, a second digital signal by using a coefficient of the high order intermodulation model and a second baseband signal output by the transmitter; and counteracting, by the apparatus, interference in a digital signal output by a receiver with the second digital signal, wherein the counteracting the interference in the digital signal output by the receiver with the second digital signal comprises:

performing, by the apparatus, adaptive balancing on the second digital signal; and subtracting the second digital signal that has been adaptively balanced from the digital signal output by the receiver.

2. The method according to claim 1, wherein the collecting the high order intermodulation signal in the radio frequency signals output by the transmitter comprises:

coupling, by the apparatus, a part of the radio frequency signals output by the transmitter;

filtering, by the apparatus, a main signal and a low order intermodulation signal in the coupled radio frequency signals to obtain the high order intermodulation signal; and amplifying, by the apparatus, the high order intermodulation signal.

3. The method according to claim 2, wherein the coupling the part of the radio frequency signals output by the transmitter comprises:

coupling, by the apparatus, the part of the radio frequency signals output by the transmitter through a section of a parallel transmission line.

4. The method according to claim 1, wherein the high order intermodulation signal in the radio frequency signals output by the transmitter is collected through a high order intermodulation collection channel; the high order intermodulation signal is processed through a feedback channel to generate the first digital signal; and the method further comprises:

controlling, by the apparatus, a connection of a pre-distortion channel for collecting the radio frequency signals output by the transmitter to the feedback channel, and a connection of the high order intermodulation collection channel to the feedback channel in a time-division manner.

5. The method according to claim 1, wherein the counteracting the interference in the digital signal output by the receiver with the second digital signal comprises:

subtracting, by the apparatus, the second digital signal from the digital signal output by the receiver to counteract the interference in the digital signal output by the receiver.

6. The method according to claim 1, wherein the adaptive balancing is implemented on combined multiple carriers or implemented separately on each carrier.

7. The method according to claim 1, wherein the counteracting the interference in the digital signal output by the receiver with the second digital signal further comprises:

delaying, by the apparatus, the digital signal output by the receiver according to a preset time if the digital signal output by the receiver is earlier than the second digital signal in time.

8. The method according to claim 1, wherein the establishing the high order intermodulation model by using the first digital signal and the first baseband signal output by the transmitter comprises:

establishing, by the apparatus, a coefficient table of the high order intermodulation model according to amplitude and phase characteristics of the first baseband signal and according to amplitude and phase characteristics of the first digital signal.

9. The method according to claim 1, wherein the generating the second digital signal by using the coefficient of the high order intermodulation model and the second baseband signal output by the transmitter comprises:

generating, by the apparatus, the second digital signal by multiplying the second baseband signal and the coefficient of the high order intermodulation model.

10. The method according to claim 1, wherein the second baseband signal comprises the first baseband signal.

11. A transceiver, comprising a transmitter and a receiver, and further comprising a processor for cancelling multi-carrier transmission interference;

wherein the processor is further configured to collect a high order intermodulation signal in radio frequency signals output by a transmitter and to process the high order intermodulation signal so as to generate a first digital signal; the processor is configured to establish a high order intermodulation model by using the first digital signal and a first baseband signal output by the transmitter and to generate a second digital signal by using a coefficient of the high order intermodulation model and a second baseband signal output by the transmitter; the processor is further configured to counteract interference in a digital signal output by a receiver with the second digital signal;

wherein the processor is configured to perform adaptive balancing on the second digital signal, wherein the processor performs the adaptive balancing on combined multiple carriers or performs the adaptive balancing separately on each carrier; and the processor is configured to subtract the second digital signal that has been adaptively balanced from the digital signal output by the receiver.

12. The transceiver according to claim 11, wherein the processor is configured to couple a part of the radio frequency signals output by the transmitter, to filter a main signal and a low order intermodulation signal in the coupled radio frequency signals to obtain the high order intermodulation signal; and the processor is further configured to amplify the high order intermodulation signal.

13. The transceiver according to claim 11, wherein the processor is configured to establish a coefficient table of the high order intermodulation model according to amplitude and phase characteristics of the first baseband signal and according to amplitude and phase characteristics of the first digital signal.

14. The transceiver according to claim 11, wherein the processor is configured to generate the second digital signal by multiplying the second baseband signal and the coefficient of the high order intermodulation model.

15. The transceiver according to claim 11, wherein the processor is configured to collect the high order intermodulation signal in the ratio frequency signals output by the transmitter through a high order intermodulation collection channel, process the high order intermodulation signal through a feedback channel so as to generate the first digital signal, and control a connection of the pre-distortion channel for collecting the radio frequency signals output by the transmitter to the feedback channel, and a connection of the high order intermodulation collection channel to the feedback channel in a time-division manner.

16. The transceiver according to claim 11, wherein the processor is configured to subtract the second digital signal from the digital signal output by the receiver to counteract the interference in the digital signal output by the receiver.

17. The transceiver according to claim 11, wherein the processor is further configured to delay the digital signal output by the receiver according to a preset time if the digital signal output by the receiver is earlier than the second digital signal in time, and to subtract the second digital signal that has been adaptively balanced from the delayed digital signal output by the receiver.

* * * * *